Nov. 25, 1952 A. B. PEARSON 2,619,176
BLOOM CUTTING MACHINE
Filed June 6, 1947 3 Sheets-Sheet 1

INVENTOR:
AXEL B. PEARSON,
BY: Donald G. Dalton
HIS ATTORNEY.

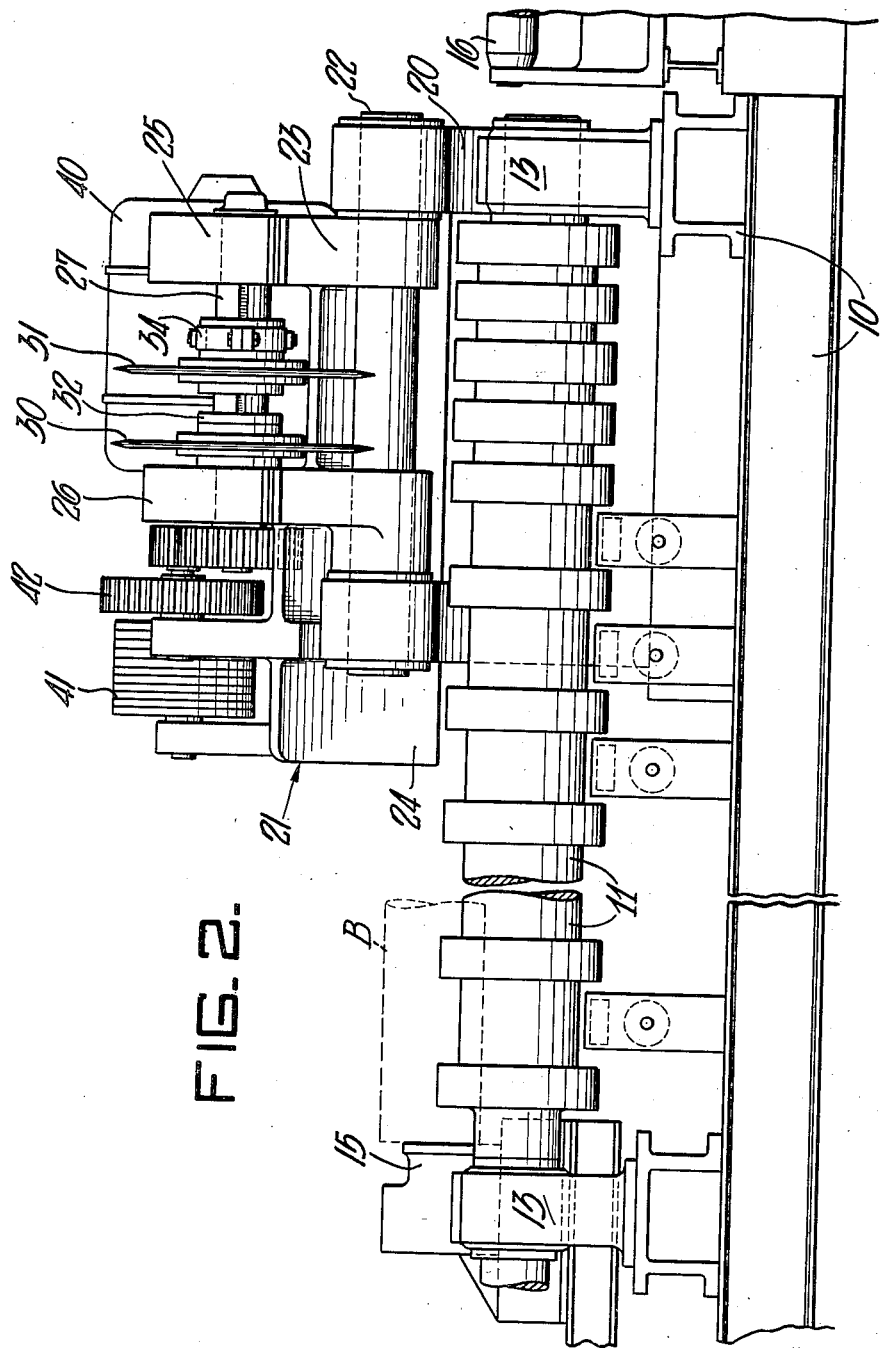

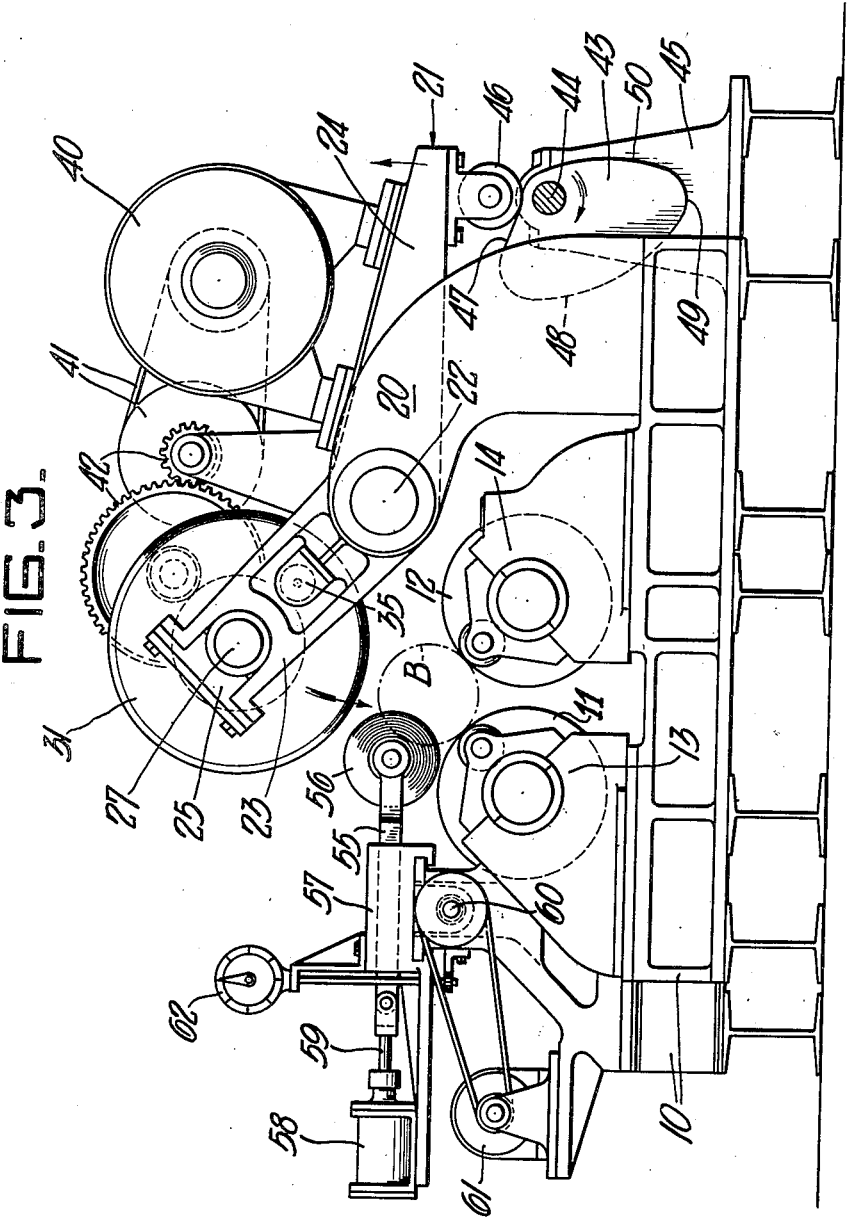

Patented Nov. 25, 1952

2,619,176

UNITED STATES PATENT OFFICE 2,619,176

BLOOM CUTTING MACHINE

Axel B. Pearson, Pittsburgh, Pa., assignor to United States Steel Company, a corporation of New Jersey Application June 6, 1947, Serial No. 753,008

3 Claims. (Cl. 164—62)

This invention relates to machines for cutting steel blooms and the like and particularly to improvements in cutters and cooperating gauge mechanisms embodied in such machines.

Machines with which the invention is concerned are employed for cutting blooms and the like into short segments, such as may be used to form railroad car wheels, gears and numerous other round articles. The usual machine comprises a pair of closely spaced, horizontally disposed, parallel rollers with drive means for rotating the rollers in the same direction. A hot steel bloom from forming rolls, for example, is placed in the valley between the rollers by appropriate handling mechanism and is rotated by engagement with the rollers. A cutter is provided for cutting the bloom in planes normal to its axis of rotation. Between cuts the bloom is advanced axially by suitable feed mechanism. The distance of advance is controlled by gauge mechanism and determines the thickness of segment cut from the bloom.

These machines may be either of a type that completely severs pieces from the bloom, or of a type that merely nicks the bloom, in which case severance may be effected in subsequent operations. In this specification and appended claims, the terms "cutting machine" and "cutter" are used to refer to either type of device. The term "segment" refers to pieces cut from the bloom, irrespective of whether severance is complete.

In the usual machine with which I am familiar, the cutter includes but a single blade, rotatably mounted but not power driven. The blade is supported on a hydraulically operated carriage, which pushes the blade into the bloom with a constant force. Such machines have the disadvantage of being relatively slow in operation, requiring approximately twice as long to complete all the cuts in a bloom as is required to roll the bloom. Due to the slowness of the cutting operation, the rolling equipment cannot be worked to much more than half of its capacity when producing blooms to be cut.

The principal object of the present invention is to provide improved bloom cutting machines capable of faster operation, whereby the time required for cutting is reduced to approximately the same as the time required for rolling.

A further object of the invention is to provide improved bloom cutters embodying dual blades and special mounting mechanism whereby the blades are positioned initially with respect to the bloom length in accordance with predetermined segment thickness and may move relatively as cutting progresses in accordance with longitudinal expansion of the bloom.

Other objects of the invention are to provide cutters having dual blades and improved cooperating gauge means whereby two segments may be cut simultaneously and the thickness of each predetermined as desired; to provide improved cutters wherein the blades are power driven, thereby facilitating penetration into the bloom; and to provide improved cutters wherein the carriage on which the blades are supported is cam operated and by proper cam design the feed rate of the blades may be varied in accordance with known variations in the penetration rate through different zones of the bloom.

In accomplishing these and other objects of the present invention, I have provided improved details of structure, a preferred form of which is shown in the accompanying drawings, wherein:

Figure 2 is a side elevational view of the machine shown in Figure 1 with the gauge mechanism removed to show other parts more clearly; and Figure 3 is a sectional view on line III—III of Figure 1.

Figure 1:
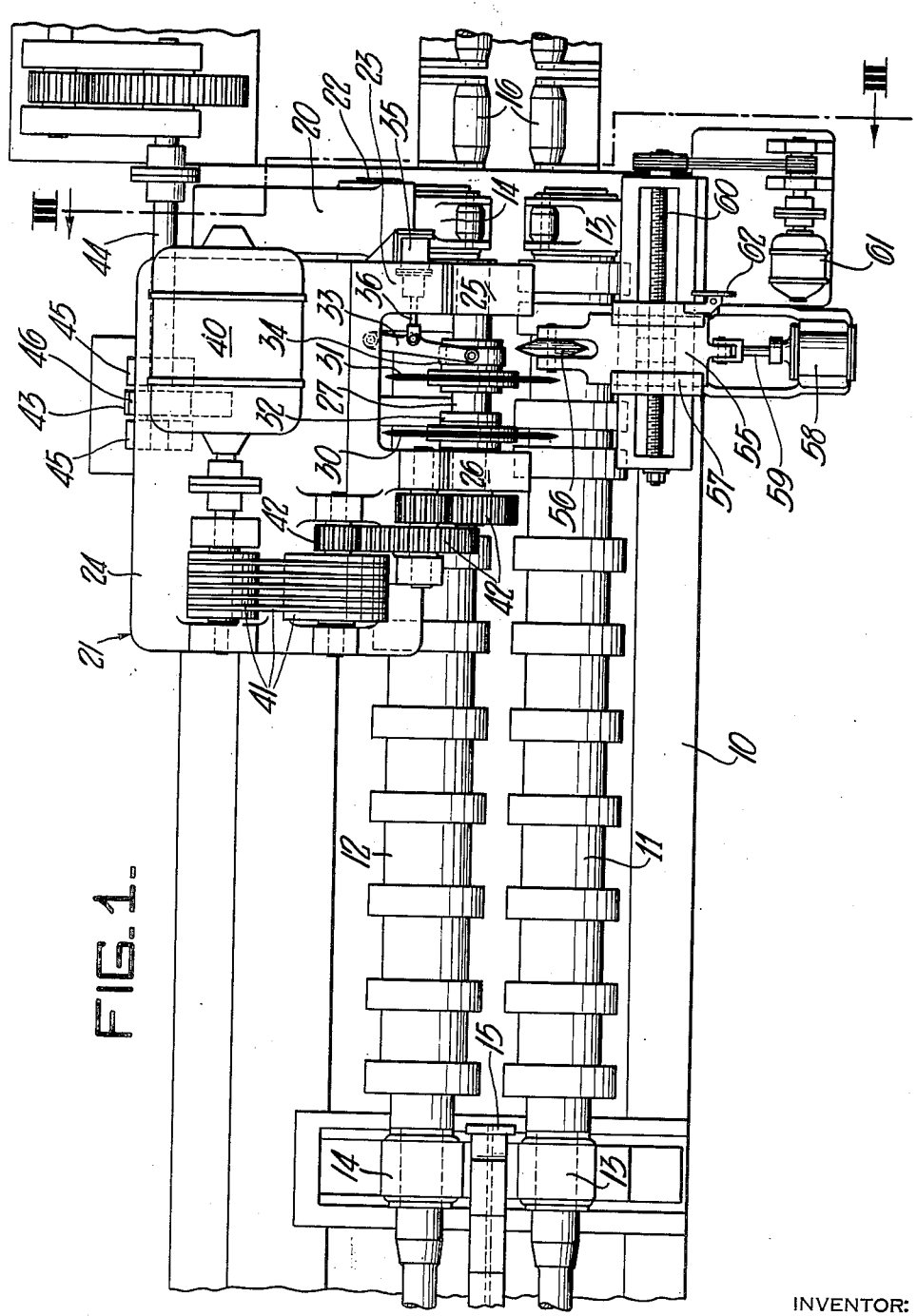
Figure 1 is a top plan view of a portion of a bloom cutting machine having installed thereon an improved cutter and cooperating gauge mechanism embodying features of the present invention.

Referring more in detail to the drawings:

In Figures 1 and 2 there is shown in plan and elevation, respectively, a bloom cutting machine that comprises a base 10 and a pair of co-extensive rollers 11 and 12 rotatably mounted on said base in bearings 13 and 14 adjacent their ends. Suitable drive means, not shown, are provided for rotating the rollers in the same direction and at the same rate. Suitable handling mechanism, not shown, is provided for introducing steel blooms to the rollers, which support a bloom in the valley therebetween and thereby impart rotation to the bloom. Feed mechanism, including ram 15, is provided for advancing the bloom between cuts, the direction of advance being toward the right as viewed in Figures 1 and 2.

I have illustrated the machine as being of the type that nicks the bloom without completely severing it. The machine therefore comprises a series of support rollers 16 beyond rollers 11 and 12 for supporting the nicked bloom as it emerges from the cutter. The present invention is equally applicable to machines that completely sever the bloom in which case support rollers 16 are replaced by a suitable conveyor.

The structure thus far described is similar to that employed in the prior art and hence is not described in greater detail.

In accordance with the present invention, a fixed cutter support 20 of goose-neck configuration (Figure 3) extends upwardly from one side of base 10 to a point above the adjacent roller 12. A carriage 21 is pivoted at its mid-portion to the upper end of said cutter support at 22 to rock thereabout on a horizontal axis. Said carriage constitutes a lever of the first class with the fulcrum at pivot point 22, and having lever arms 23 and 24.

Arm 23 is bifurcated to provide axially aligned bearings 25 and 26 within which a blade shaft 27 is rotatably mounted (Figure 1). A pair of disc-shaped blades 30 and 31 are keyed to said blade shaft to rotate therewith. The blades have circumferential cutting edges and are of materially increased thickness away from the cutting edge in order to furnish necessary mechanical strength and resistance to wear.

Blade 30 is fixedly keyed to the shaft and blade 31 keyed thereto for relative sliding movement longitudinally of the shaft. An adjustable spacer 32 is mounted on shaft 27 between blades 30 and 31 and functions to limit movement of blade 31 toward blade 30.

In operation blades 30 and 31 make simultaneous cuts and thereby cut two segments from the bloom, designated B. One bloom segment lies beyond or to the right of movable blade 31 and the other segment lies between the blades. The thickness of the segment beyond blade 31 is controlled by gauge mechanism hereinafter described. The thickness of the segment between the blades is governed by the initial distance between said blades, that is, the distance when the cut is started. Therefore spacer 32 is adjusted to a position such that when movable blade 31 is against said spacer the distance between the cutting edges of the blades equals the desired segment thickness.

Means are provided for initially moving blade 31 into engagement with spacer 32 and releasing said blade for sliding movement with respect to blade shaft 27 as soon as cutting is underway. Such release is necessary for the reason that the bloom expands in length in the regions of the cuts as the thickness of the blade away from the cutting edge enters the cut.

As shown in Figure 1, the blade moving and releasing means includes a lever 33 pivoted at one end to carriage 21 and pivotally and slidably connected at the other end to a collar 34 slidably mounted on blade shaft 27 immediately beyond blade 31. An air cylinder 35 is mounted on the carriage and contains a single acting piston connected to lever 33 by a piston rod 36. Before a cut is started, air is applied to cylinder 35 to force blade 31 to the left and into engagement with spacer 32. As soon as cutting is underway, the air is released so that blade 31 is free to move to the right longitudinally of the blade shaft in accordance with longitudinal expansion of the bloom.

Preferably the blade shaft is power driven, since friction alone between the blades and bloom may not provide sufficient force for rotating the blades and effecting a cut. Such friction tends to rotate the blades in the direction opposite from rotation of the bloom and the power drive assists in imparting such rotation. Power drive on the blades thus increases cutting speed, particularly when two blades are employed.

The power drive means comprises a motor 40 mounted on arm 24 of carriage 21. Said motor is operatively connected with blade shaft 27, as by the belt and pulley means 41 and speed reducing gears 42. (Figures 1 and 3).

The carriage is balanced so that arm 24 is heavier than arm 23. Arm 24 therefore normally assumes the down position and the blades are out of engagement with the bloom. The weight of motor 40 assists in establishing such balance.

Cam means are provided for raising arm 24 and thereby forcing the blades into the bloom when it is desired to make a cut. As best shown in Figure 3, said cam means includes a cam 43 fixed to a cam shaft 44, which is rotatably mounted in bearings 45 on base 10. The underside of arm 24 of the carriage carries a rotatable cam follower 46 that engages the peripheral surface of said cam. The cam shaft is driven to rotate in a clockwise direction, as viewed in Figure 3 by suitable motor and speed reducing mechanism.

The preferred cam outline is as illustrated in Figure 3, in which the blades are shown in the position fartherest removed from the bloom. In this position cam follower 46 engages the cam sector of minimum radius.

Following the sector of minimum radius, the radius of the cam increases rapidly in a sector designated 47 and engagement of the follower with the latter sector lowers the blades into cutting engagement with the bloom and starts a pair of cuts.

Following sector 47 is a sector of slightly increasing radius designated 48. Cam follower 46 engages sector 48 as the blades make the most difficult part of the cut, that is, where the thickness of the blades away from the cutting edges is being forced into the cuts. In this zone the rate of feeding the blades is slowest.

Following sector 48 the cam has another sector of rapidly increasing radius, designated 49. The cam follower engages sector 49 as cutting becomes easier and feeding of the blades may be more rapid.

Following cam sector 49 is a sector 50 of rapidly decreasing radius which the cam follower engages after completion of a cut and while the blades are being removed from the bloom.

As hereinbefore mentioned, gauge mechanism is provided for controlling the length of segments cut from the bloom beyond movable blade 31.

As best shown in Figure 1, the gauge mechanism includes a carrier 55 supported on base 10, and mounted for both longitudinal and transverse movement with respect to said base. A gauge wheel 56 is rotatably mounted at the inner end of the carrier and may engage the bloom and rotate therewith without interfering with rotation of the latter. In the machine illustrated, which does not completely sever the bloom, the edge of the gauge wheel is tapered whereby it may enter the edges of a cut or nick. In a machine which provides for complete severance, the wheel preferably would be flat to engage the forward end of the bloom prior to each severance.

Carrier 55 is slidably mounted on a block 57 to provide for its transverse movement with respect to the base. Block 57 also carries a double acting air cylinder 58, the piston of which is connected to carrier 55 by a piston rod 59.

After completion of a cut and as the bloom is advanced for the next cut, the carrier is moved pneumatically to extended position. In this position engagement of wheel 56 within a nick or against the bloom end, as the case may be, stops advance of the bloom. The longitudinal distance between the cutting edge of movable blade 31 and the edge of gauge wheel 56 at the time cutting commences thus determines the thickness of segment cut beyond the movable blade.

As soon as cutting is underway, carrier 55 is moved pneumatically to retracted position in order that gauge wheel 56 does not interfere with bloom expansion.

Means are provided for moving block 57 longitudinally of the base and thereby adjusting the distance between gauge wheel 56 and blade 31 in order to adjust the thickness of segments cut beyond said blade. As best shown in Figure 1, such means includes a screw-threaded shaft 60 rotatably mounted in suitable bearings on base 10 and threadedly engaged with a bearing on the underside of block 57. Preferably power means, such as a motor 61 and suitable connecting mechanism, are provided for rotating shaft 60 and thereby adjusting the position of the gauge wheel. If desired, an indicator 62 of known construction may be provided for showing the distance between blade 31 and said gauge wheel.

The operation of a bloom cutting machine embodying a cutter and gauge mechanism constructed as described is as follows:

Before cutting a bloom or the like, the machine is adjusted so that segments cut therefrom are of predetermined thickness. Adjustment is accomplished by setting spacer 32 on blade shaft 27 so that the distance between blades 30 and 31 when blade 31 bears against the spacer equals one segment thickness, and by setting gauge wheel 56 so that the distance between the gauge wheel and movable blade equals the other segment thickness. It is seen that thickness of the two segments cut by one operation may be equal or unequal as desired. By action of air cylinders 35 and 58, respectively, movable blade 31 is moved into abutment with spacer 32 and gauge wheel 56 is moved to extended position.

Rollers 11 and 12 are driven to rotate in the same direction and at the same rate. A hot bloom B or the like from the forming rolls is introduced to rollers 11 and 12 and advanced to the right by ram 15 until the forward end engages gauge wheel 56.

Cam shaft 44 and cam 43 are rotated clockwise as viewed in Figure 3. Blade shaft 27 and blades 30 and 31 are rotated by motor 40 in a direction opposite to bloom rotation. Rotation of the cam initially rocks carriage 21 counterclockwise about fulcrum 22 and forces the blades into the bloom to make a pair of cuts. Rate of feed of the blades is controlled by the cam outline as hereinbefore explained.

As soon as cutting is underway, the air to cylinder 35 is released, thus releasing blade 31 for free sliding movement relative to shaft 27. At the same time, air cylinder 58 is actuated to retract gauge wheel 56 out of the path of advance of the bloom. The bloom is thus freed so that it may expand longitudinally in the cuts as the thickness of the blades enter the cuts.

Continued rotation of cam 43 completes feeding of the blades to the desired depth of cut and then rocks carriage 21 in a clockwise direction to remove the blades from the completed cuts.

The cycle just described is repeated until the bloom or the like is completely cut to segments of the desired thickness.

It is seen that cutting two segments from the bloom simultaneously approximately doubles the rate at which the cutting of a bloom may be effected. Therefore cutting time is reduced to approximately the same duration as rolling time. Increased utilization of rolling equipment is thereby accomplished.

I have described the machine of the present invention in connection with the cutting of steel blooms. However, it is apparent that the same or similar machines may be employed for cutting heated metallic articles of other types. Therefore, by designating the machine as a "bloom cutting machine" I do not intend to exclude machines similarly constructed, but employed for cutting articles other than blooms.

While I have shown but certain embodiments of the present invention, it is apparent that the structure is susceptible of modification without departing from the spirit of the invention. Therefore I do not wish to be limited by the disclosure set forth, but only by the scope of the appended claims.

I claim:

1. A bloom cutting machine comprising support means adapted to carry and rotate blooms, a carriage mounted on said support means for rocking on an axis parallel to blooms carried thereon, a blade shaft rotatably mounted on said carriage, a pair of spaced apart disc-like blades mounted on said shaft and having circumferential cutting edges and being of materially greater thickness inwardly of their cutting edges so that they expand a bloom longitudinally as they cut segments therefrom, one of said blades being movable longitudinally of the shaft toward and away from the other blade, a stop on said shaft between said blades limiting movement of said movable blade toward the other blade, fluid pressure actuated means on said carriage operatively connected with said movable blade for moving the latter along said shaft into engagement with said stop, means for cutting off the fluid pressure to allow said movable blade to move freely away from the other blade and thus to allow for longitudinal expansion in a bloom during cutting, and means for rocking said carriage and thereby simultaneously making a pair of cuts in the bloom.

2. A bloom cutting machine comprising support means adapted to carry and rotate blooms, a carriage mounted on said support means for rocking on an axis parallel to blooms carried thereon, a blade shaft rotatably mounted on said carriage, a pair of spaced apart disc-like blades mounted on said shaft and having circumferential cutting edges and being of materially greater thickness inwardly of their cutting edges so that they expand a bloom longitudinally as they cut segments therefrom, one of said blades being movable longitudinally of the shaft toward and away from the other blade, a stop on said shaft between said blades limiting movement of said movable blade toward the other blade, a collar slidably mounted on said shaft outside said movable blade, a lever pivotally mounted on said carriage and operatively connected to said collar, fluid pressure actuated means on said carriage operatively connected with said lever for moving said collar and said movable blade along said shaft toward the other blade, means for cutting off the fluid pressure to allow said movable blade to move freely away from the other blade and thus to allow for longitudinal expansion in a bloom during cutting, and means for rocking said carriage and thereby simultaneously making a pair of cuts in the bloom.

3. A bloom cutting machine comprising support means adapted to carry and rotate blooms, a carriage mounted on said support means for rocking on an axis parallel to blooms carried thereon, a blade shaft rotatably mounted on said carriage, a pair of spaced apart disc-like blades mounted on said shaft and having circumferential cutting edges and being of materially greater thickness inwardly of their cutting edges so that they expand a bloom longitudinally as they cut segments therefrom, one of said blades being movable longitudinally of the shaft toward and away from the other blade, a stop on said shaft between said blades limiting movement of said movable blade toward the other blade, pressure means on said carriage operatively connected with said movable blade for moving the latter along said shaft into engagement with said stop, means for releasing said pressure means to allow said movable blade to move freely away from the other blade and thus to allow for longitudinal expansion in a bloom during cutting, and means for rocking said carriage and thereby simultaneously making a pair of cuts in the bloom.

AXEL B. PEARSON.

REFERENCES CITED

The following references are of record in the file of this patent:

UNITED STATES PATENTS

| Number | Name | Date |
|---|---|---|
| 1,002,690 | Heyl | Sept. 5, 1911 |
| 1,258,663 | Eddy | Mar. 12, 1918 |
| 1,278,857 | Clark et al. | Sept. 17, 1918 |
| 1,549,429 | Bartlett | Aug. 11, 1925 |
| 1,698,251 | Adams | Jan. 8, 1929 |
| 1,801,038 | Ewing | Apr. 14, 1931 |
| 1,922,426 | Fahrney | Aug. 15, 1933 |
| 1,925,498 | Plante | Sept. 5, 1933 |
| 2,064,017 | Leschen | Dec. 15, 1936 |
| 2,109,786 | Taft | Mar. 1, 1938 |
| 2,365,902 | Powers | Dec. 26, 1944 |
| 2,446,198 | Socke | Aug. 3, 1948 |

OTHER REFERENCES

"The Making, Shaping, and Treating of Steel"; Carnegie Steel Company, 46th edition (copy at Patent Office.)